(12) United States Patent
Hasvold (10) Patent No.: US 6,573,008 B1
(45) Date of Patent: Jun. 3, 2003

(54) BATTERY SYSTEM

(75) Inventor: Øistein Hasvold, Oslo (NO)

(73) Assignee: Den Norske Stats Oljeselskap A.S., Stavanger (NO)

( * ) Notice: Subject to any disclaimer, the term of this patent is extended or adjusted under 35 U.S.C. 154(b) by 0 days.

(21) Appl. No.: 09/509,834

(22) PCT Filed: Oct. 12, 1998

(86) PCT No.: PCT/NO98/00309

§ 371 (c)(1),
(2), (4) Date: Jun. 2, 2000

(87) PCT Pub. No.: WO99/21242

PCT Pub. Date: Apr. 29, 1999

(30) Foreign Application Priority Data

Oct. 23, 1919 (NO) ................................ 974905

(51) Int. Cl.⁷ ............................................. H01M 12/04
(52) U.S. Cl. ................. 429/231.8; 429/72; 429/206
(58) Field of Search ................. 429/206, 231.8, 429/82, 72

(56) References Cited

U.S. PATENT DOCUMENTS

| | | | |
|---|---|---|---|
| 4,198,475 A | 4/1980 | Zaromb | 429/15 |
| 4,296,429 A | 10/1981 | Schroeder | 357/55 |
| 4,305,999 A | 12/1981 | Zaromb | 429/14 |
| 4,910,102 A | 3/1990 | Rao et al. | 429/51 |
| 5,340,667 A | * 8/1994 | Stinson et al. | 429/72 X |
| 5,427,871 A | 6/1995 | Garshol et al. | 429/119 |
| 5,445,905 A | 8/1995 | Marsh et al. | 429/105 |

FOREIGN PATENT DOCUMENTS

| | | |
|---|---|---|
| EP | 0 308 548 A1 | 3/1989 |
| NO | 171937 | 2/1993 |
| WO | WO 90/12426 | 10/1990 |
| WO | WO 92/14272 | 8/1992 |

OTHER PUBLICATIONS

Hasvold, Oistein, "Development of an alkaline aluminium/air battery system at the Norwegian Defence Research Establishment", *Chemistry and Industry*, Fe. 1, 1988, pp. 85–88.

Storkersen, Nils, "Development of a 120 w/24 v Mechanically Rechargeable Aluminium–Air Battery for Military Applications", Norwegian Defence Research Establishment, pp. 213–223. (no date).

Deuchars, G.D., et al., "Aluminum–Hydrogen Peroxide Power System for an Unmanned Underwater Vehicle", IEEE (93CH3341–5), vol. 2, (no month) 1993, pp. II–158–II–165.

* cited by examiner

*Primary Examiner*—John S. Maples
(74) *Attorney, Agent, or Firm*—Foley & Lardner (57) ABSTRACT

The present invention relates to a cell for the production of electric energy by reaction between hydrogen peroxide or oxygen, and aluminium or lithium or a mixture thereof, and hydroxyl ions in water, where the cathodes are cylindrical and based on radially oriented carbon fibres attached to a stem of metal. The novel feature of the invention is that by utilizing such cathodes in a cell with circulating electrolyte, it is possible to keep the concentration of oxidant in the electrolyte low and thus obtain high utilization of the reactants.

15 Claims, 5 Drawing Sheets

Fig. 1

PRIOR ART

BATTERY SYSTEM

FIELD OF THE INVENTION

The invention relates to a battery for the production of electric energy by reaction between hydrogen peroxide ($H_2O_2$) or oxygen, and aluminium or lithium or a mixture thereof, and which utilizes electrodes of bottle brush shape, and which can mechanically be charged by inserting metal anodes. The advantages of the invention are a battery with high utilization of the reactants combined with the possibility of quick mechanical charging.

The main object of the invention is a battery which can be utilized for the energy supply of small unmanned underwater vehicles (UUV), but the invention is not limited for this use only. The battery is going to have pressure-compensated operation, i.e. the battery does not have to be encapsulated in a pressure tank. The cells are based on an alkaline electrolyte with $H_2O_2$ or oxygen as the oxidant, and metal anodes. The oxidant is added to the electrolyte, and the electrolyte is pumped through the cells in the battery. The anode material are alloys which form soluble reaction products by anodic dissolution in alkaline electrolyte.

RELATED PRIOR ART

"Bottle brush" electrodes are known from NO 171 937, (Garshol and Hasvold), where there is described electrodes formed as bottle brushes. The purpose of these bottle brush electrodes are to obtain maximum area of the electrodes combined with good conductivity, low resistance to flow and a sufficiently mechanically stable solution.

Batteries which utilize oxygen or hydrogen peroxide, where a circulation of electrolyte takes place, are known from U.S. Pat. No. 4,305,999 (Zaromb). The anode is made of consumable metal, especially zinc, magnesium or aluminium. The purpose of the '999 Patent is to regulate the electrolyte level in the battery cell in relation to the power consumption in such a way that unnecessary corrosion is prevented.

U.S. Pat. No. 4,910,102 describes a battery and a process for operating the battery, where bipolar electrodes are included consisting of an inert cathode which works as a hydrogen peroxide electrode, and an anode plate of aluminium, magnesium or alloys thereof. (In the abstract for U.S. Pat. No. 4,910,102 there seems to be an error: There is referred to a hydrogen electrode, but it seems to be a hydrogen peroxide electrode. Further there is referred to bipolar cathodes; the correct term seems to be bipolar electrodes). The electrolyte flows through the battery, and $H_2O_2$ is added in concentrations between 0.5% and 30% as volume part of the electrolyte. The electrolyte is, for example, sea water.

Expected time of discharge for such a battery for an unmanned underwater vehicle is long, typically more than 10 hours. The long time of discharge gives low current densities which subsequently allows for relatively large electrodes and a large distance between the electrodes in the cells of the battery. The battery comprises one or more cells. Anode materials of current interest are alloys which form soluble reaction products by anodic dissolution in an alkaline electrolyte. The rate of corrosion of the metal in the electrolyte has to be relatively low, which excludes the alkaline metals, except for lithium. Most appropriate are probably alloys of aluminium such as utilized earlier in FFI's alkaline aluminium/air battery and as described in Hasvold: "Development of an alkaline aluminium/air battery system". Chemistry and Industry (1988), pp 85–88, and Størkersen: "Development of a 120 W/24V Mechanically Rechargeable Aluminium-Air Battery for Military Applications". Power Sources 13, (1991), Ed.: Keily, T. and Baxter, B. W., pp 213–224.

Galvanic cells, which utilize hydrogen peroxide (HP) as oxidant ("cathodic depolarizer"), have been known for long. In some systems, HP is utilized directly in the cell, while in other systems, HP is used as a storage medium for oxygen, i.e. as an oxygen carrier. In the last case, one lets $H_2O_2$ decompose in a reactor and supplies the cells with oxygen from this reactor:

$$2H_2O_2 = 2H_2O + O_2 \tag{1}$$

The oxygen is consumed in a gas cathode in a fuel cell or in a metal/oxygen battery. A typical example of such a technology is Alupowers's alkaline aluminium/oxygen battery for operation of unmanned underwater vehicles and is described in Deuchars, G. D. et al.: "Aluminium- hydrogen peroxide power system for an unmanned underwater vehicle" Oceans 93 (1992), Vancouver, pp 158–165. In other cells, as e.g. described by Zaromb in U.S. Pat. No. 4,198,475, HP is added directly to the cathode in an aluminium/hydrogen peroxide battery with alkaline electrolyte. Whether HP decomposes in the electrolyte under formation of oxygen which in turn is reduced on the cathodes, or HP is reduced directly on the electrode surface, makes little difference in practice.

The advantage of utilizing HP as oxidant instead of oxygen is that the storage is substantially easier. Further, HP is miscible with water and can be added directly to the electrolyte in the desired concentration. In a UUV, the storage can also, if desired, be made outside the pressure hull. According to equation (1), 1 kg pure HP equals 0.471 kg oxygen. Pure HP implies a handling risk, as HP is unstable and the decomposition of HP releases a considerable amount of energy. This risk is considerably reduced by increasing the contents of water. 70% HP can be handled by attention to special precautionary measures, and at 50%, the heat of decomposition is no longer sufficient for complete vapourization of the water forming. In 70% HP, the "oxygen part" of the weight constitutes approx. 33% and in 50% HP approx. 24%. Liquid oxygen, LOX, provides effective storage based on weight, but cryogenic storage of oxygen demands a certain thickness of the isolation, so that one for small systems gets very voluminous tanks in relation to the useful volume. The demand for insulation increases with the time the oxygen is to be stored. Further, a cryogenic storage tank is basically not suitable at large external pressures. For this reason, the storage in a UUV has in practice to be carried out in a pressure tank, which makes the system not very well suited for application in small vehicles.

The last and most common storage form for oxygen is under pressure in cylindrical- or spherical pressure tanks (bottles). This is very practical as long as the pressure of the battery is less than the bottle pressure, as the oxygen supply can be regulated by operating a valve. The tanks can be exposed to external pressure and be arranged on the outside of the pressure hull. Traditional metal tanks are heavy, typically an empty weight of 15 kg can store 4 kg oxygen, but fibre reinforced tanks can be made considerably lighter, and a storage capacity of 40–50% is not unlikely in the future.

At 300 bar, oxygen has a density of approx. 0.4 kg/litre and a system density by utilizing fibre-reinforced tanks of approx. 0.2 kg oxygen/litre. This provides somewhat more voluminous storage by utilizing pressure tanks than by oxygen storage in the form of 50% HP. Further, it has to be taken into consideration that with UUV batteries which operate at ambient pressure, the oxygen has to actively be pumped out of the bottles when external pressure is higher than the bottle pressure. This is a considerable problem for UUV's which are to operate at great depths. In comparison, a HP storage will normally have ambient pressure independent of depth. Finally, it should be mentioned that while HP can directly be mixed in the electrolyte in the desired concentration, the solubility of oxygen in the electrolyte is low. Even if the solubility increases proportionally with pressure, the rate of dissolution is relatively slow, which can entail a complex system for the mixing of oxygen into the electrolyte. For the above mentioned reasons, one has primarily considered the use of HP in UUV batteries, but an oxygen-based battery which operates at a pressure of more than 5 to 10 bar, will have almost identical properties.

A problem with batteries where the oxidant is dissolved in the electrolyte is that the oxidant and anode metal can be consumed by direct reaction with each other. For Al this gives:

(2)

(3)

These non-current-producing reactions lead to losses of reactants and subsequently to reduced energy output from the cell. Further, they lead to an undesired heat generation in the cell. Reactions (2) and (3) also lead to a rise in anode potential, which reduces the cell voltage.

Both oxygen and $H_2O_2$ are strong oxidants which in strongly alkaline solutions very quickly react with anode materials of current interest, such as aluminium/tin alloys. By sufficiently high reactivity, the rate of reaction will be limited by the transport of oxidant to the anode surface (limiting current conditions). The rate of transport is given by the local hydrodynamic conditions. Hydrodynamic parameters which influence the limiting current are among others the character of the electrolyte flow (laminar/turbulent) and local velocity of flow and the physical dimensions of the anode. The rate of transport at limiting current will be close to being proportional to the concentration of oxidant. Thus, it is important to keep the concentration of oxidant in the electrolyte as low as possible. To reduce this parasitic reaction between oxidant and anode metal, it is common to use a membrane which separates the solution which surrounds the cathodes and which contains the oxidant (the catholyte) from the electrolyte surrounding the anodes (the anolyte). The loss according to (2) and (3) will then be reduced to the amount of oxidant which diffuses through the membrane.

Figure 1:
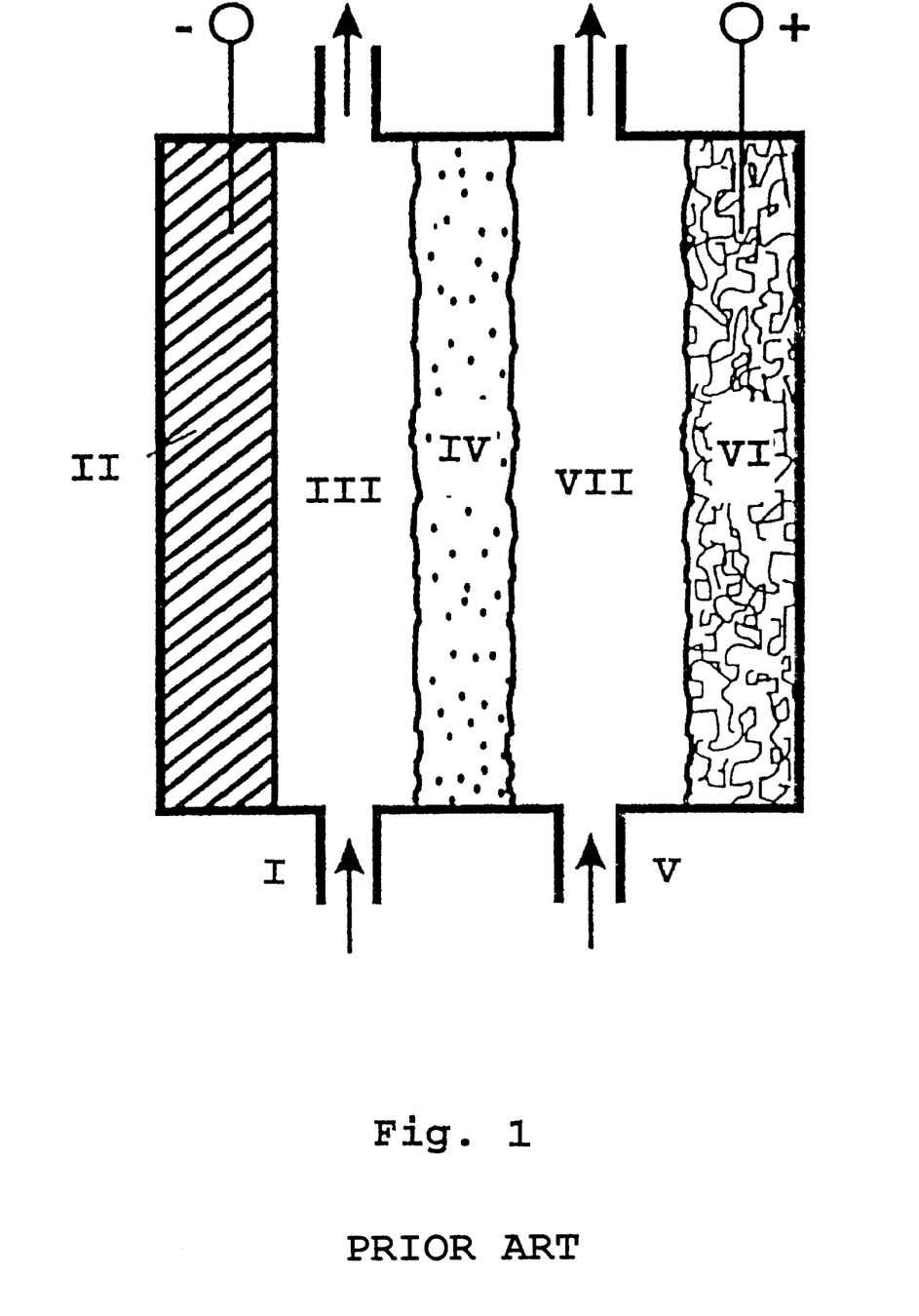
FIG. 1 shows schematically a cell based on separate anolyte and catholyte.

FIG. 1 shows schematically a cell based on separate anolyte and catholyte, according to the related prior art.

The cell is composed of an anode chamber I with an anode II in an anolyte III. Between the anode chamber and the cathode chamber V, a membrane or separator IV which separates the anolyte III from the catholyte VII, but which allows transport of current (ions) through the membrane. The positive electrode in the cell, the cathode VI is made of an electrically conductive material which is a good catalyst, or is covered by a good catalyst, with a view to the reduction of hydrogen peroxide or oxygen or which catalyzes the decomposition of hydrogen peroxide followed by the reduction of oxygen.

The anode II can for example consist of pure aluminium alloyed with 0.1% tin, while the anolyte III can e.g. be 7 M KOH or NaOH. Also, the catholyte VII can consist of 7 M KOH, but will also contain oxidant ($H_2O_2$ or $O_2$). For ensuring good stirring and thermal control, the electrolytes may be circulated between one or more cells and a reservoir. Further, the oxidant has to be supplied to the catholyte as it is consumed. The addition can be controlled by either a sensor on the oxidant in the electrolyte or from the calculated consumption from Faraday's law and an estimate of the expected corrosion.

The cell according to the related art in FIG. 1 produces current by oxidation of aluminium at the anode II according to

(4)

The electrons are consumed at the cathode VI according to

(5)

either by direct reduction of HP, or by decomposition followed by the reduction of oxygen forming:

5b

The sum of the anode and cathode reactions gives the cell reaction, i.e.

(6)

It appears from the equations that there is a consumption of both aluminium, hydrogen peroxide and hydroxyl ions when the cell delivers current. According to equation (6) and Faraday's law, 9 grams of Al, 17 g HP and 62 g 7 M KOH are consumed to deliver 1 F current. This corresponds to 305 Ah/kg.

Unfortunately, in a real system, a substantially lower charge density is obtained. This is partly due to the fact that the entire alkaline electrolyte cannot be consumed, and partly due to parasitic reactions which lead to the consumption of reactants (corrosion reactions). Beside direct reactions between oxidant and aluminium according to equations (2) and (3), there is a reaction between aluminium and water under the generation of hydrogen:

(7)

Also by this reaction there is a consumption of hydroxyl ions. In addition, this reaction leads, unlike the reactions (2) and (3), to the formation of hydrogen. Hydrogen which is not dissolved in the electrolyte, will form gas which has to be removed from the battery as it is formed. This is unlike oxygen, which can be removed by cathodic reduction in the battery as long as it is dissolved in the electrolyte. Especially at high pressures where the solubility of oxygen in the electrolyte is high, the oxygen will not contribute to the formation of gas in the battery. Notwithstanding this, an aluminium-based battery with an alkaline electrolyte, capable of functioning, has to have a system for the handling of gas being formed.

Generally, corrosion does not lead to reduced energy density until the corrosion current approaches the same order of magnitude as the average cell current. Further, it is evident that it is desired to keep the losses due to corrosion low, both for preventing loss of reactants, and also for reducing the problem with the formation of hydrogen in the battery.

The decomposition of water according to (7) can be kept at a low level by utilizing electrolytes and alloys with a very low impurity level. Further, the rate of reaction (7) is reduced by adding stannate to the electrolyte and by keeping a low temperature. These are techniques being well known from the work of the inventor and others on alkaline aluminium/air and aluminium/oxygen batteries. On the other hand, it is desired to operate at high temperature for reducing the polarization of the electrodes and to increase the conductivity of the electrolyte. Both these factors increase the cell voltage under load.

Depending among other things on the load, how well the cathode is catalyzed, the concentration of oxidant, the temperature and the aluminium alloy used, the typical cell voltage will be in the range of 1.2 to 1.6 V for such a cell under load. Other factors affecting the cell voltage are ohmic losses in the system, given by the current density, the geometry of the cell and the conductivity of the membrane. For keeping ohmic losses as low as possible, it is desired to minimize the distance between the anode and cathode. Further, one desires to have low resistance in the membrane separating the anolyte and catholyte. For a given membrane material, the membrane resistance will decrease with decreasing thickness, but, at the same time, losses of oxidant from the catholyte to the anolyte increas with increasing losses according to (2) and (3) as a result. Further, mechanical strength sets a lower limit for membrane thickness. An elegant solution where a porous cathode acts as separator between anolyte and catholyte is disclosed by C. L. Marsh et al in U.S. Pat. No. 5,445,905. Thereby the problem of voltage drop across the membrane which separates anolyte and catholyte is avoided. For preventing contact between anode and cathode, a coarse-meshed insulating net is utilized.

The advantages of a membrane-based system can be summarized by:
a) Low losses of capacity by direct reaction between oxidant and anode.
b) The concentration of oxidant can be kept high, which makes high current densities on the cathode possible.
c) Solid particles in the anolyte (such as $Al(OH)_3$) does not affect the cathode reaction. while the disadvantages are
d) Complicated structure of the cells with separate circuits for anolyte and catholyte.
e) The membrane contributes to the ohmic losses in the battery.
f) Membranes are not very mechanically robust.

Especially for batteries for repeated use, the points d) and f) provide problems with reliability. Such batteries are mechanically charged by draining of the electrolyte, anodes are replaced, new electrolyte is filled up and container with oxidant is refilled. This leads to demands for easy disassembling and leak proof operation which can be difficult to satisfy.

SUMMARY OF THE INVENTION

The above mentioned disadvantages of the prior art are solved by utilizing a cell for the production of electric energy by reaction between hydrogen peroxide or oxygen, and aluminium or lithium or a mixture thereof, and hydroxyl ions in water, where the cathodes are cylindrical and based on radially oriented carbon fibres attached to a stem of metal. The novel feature of the invention is that the anodes and cathodes are arranged in a flowing electrolyte of KOH or NaOH dissolved in water, and where the electrolyte contains the oxidant in low concentration.

In the following, there will be given a detailed description with reference to the appended drawings which illustrate a preferred embodiment of the invention.

DETAILED DESCRIPTION OF THE PREFERRED EMBODIMENT OF THE INVENTION

Figure 2:
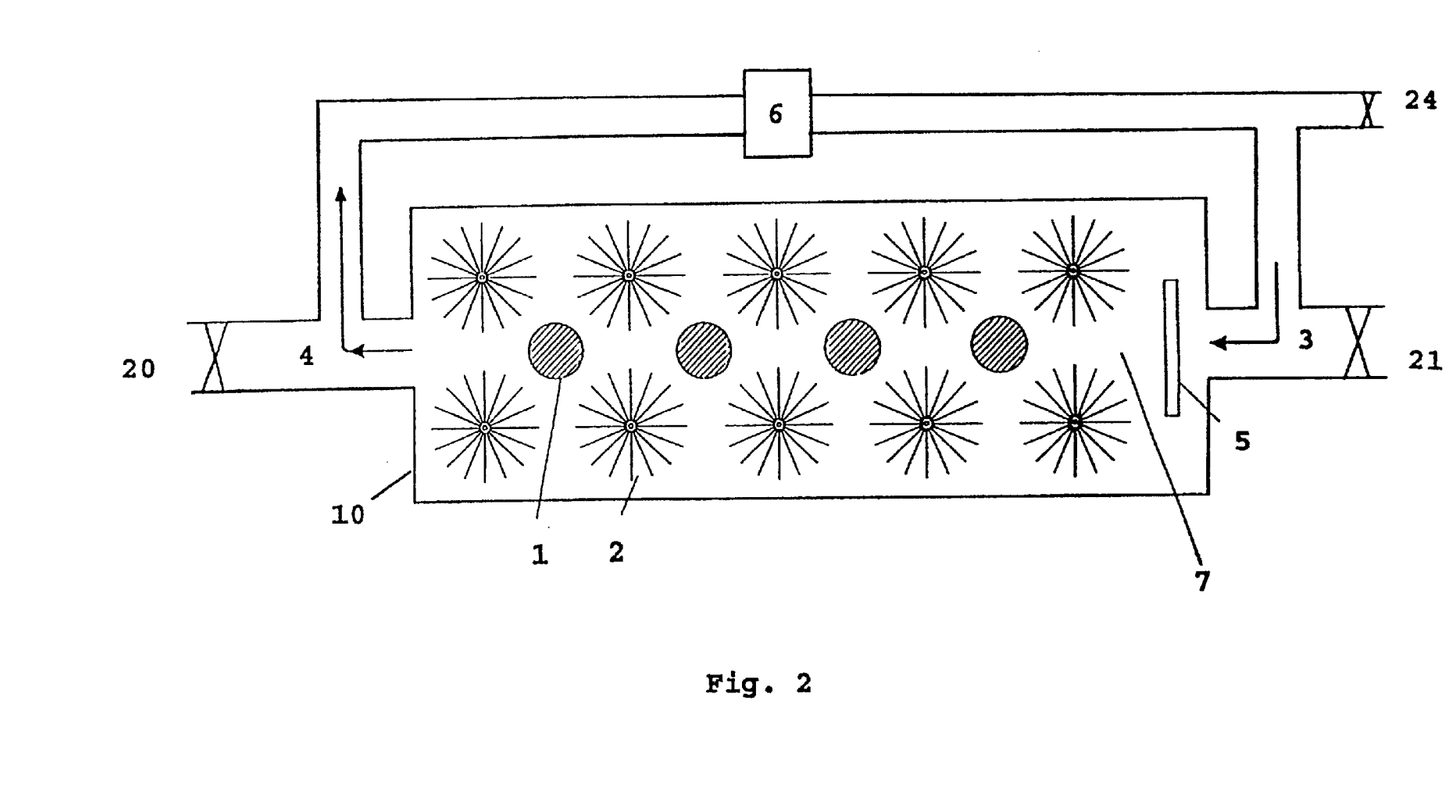
FIG. 2 shows a schematic plan view of the cell and the circulation system.

FIG. 2 shows the main features of a cell 10 with anodes 1 and cathodes 2 in an electrolyte 7. The cell produces electric energy by the reaction between hydrogen peroxide or oxygen, and aluminium or lithium or a mixture thereof, and hydroxyl ions in water. Cathodes 2 are cylindrical and based on radially oriented carbon fibres attached to a stem of metal. Anodes 1 and cathodes 2 are arranged in a flowing electrolyte 7 of KOH or NaOH dissolved in water, and with the electrolyte 7 containing the oxidant in low concentration.

Pump means 6 is adapted to pump electrolyte 7 from an electrolyte outlet 4 in the cell 10 to an electrolyte inlet 3 in the same cell. In a preferred embodiment, there is arranged an electrolyte distributor 5 after inlet 3 on cell 10, which causes the electrolyte 7 to be distributed as evenly as possible across the cross section of cell 10.

For a battery containing several cells, the electrolyte can move from cell to cell (serial flow) or parallel via in-and outlet manifolds (parallel flow). Both cases can be based on the use of one or more pumps for the circulation and one or more pumps for the dosing of HP to the electrolyte.

In a preferred embodiment of the invention the concentration of KOH or NaOH between 2 and 15 molar. The oxidant which is added to the electrolyte is oxygen or hydrogen peroxide, in a preferred embodiment between 0.001 molar and 0.1 molar.

Anodes 1 and cell 10 are arranged for replacement of electrodes 1. Further, valves 20, 21 are arranged in the cell 10 for replacement of the electrolyte 7.

Figure 3:
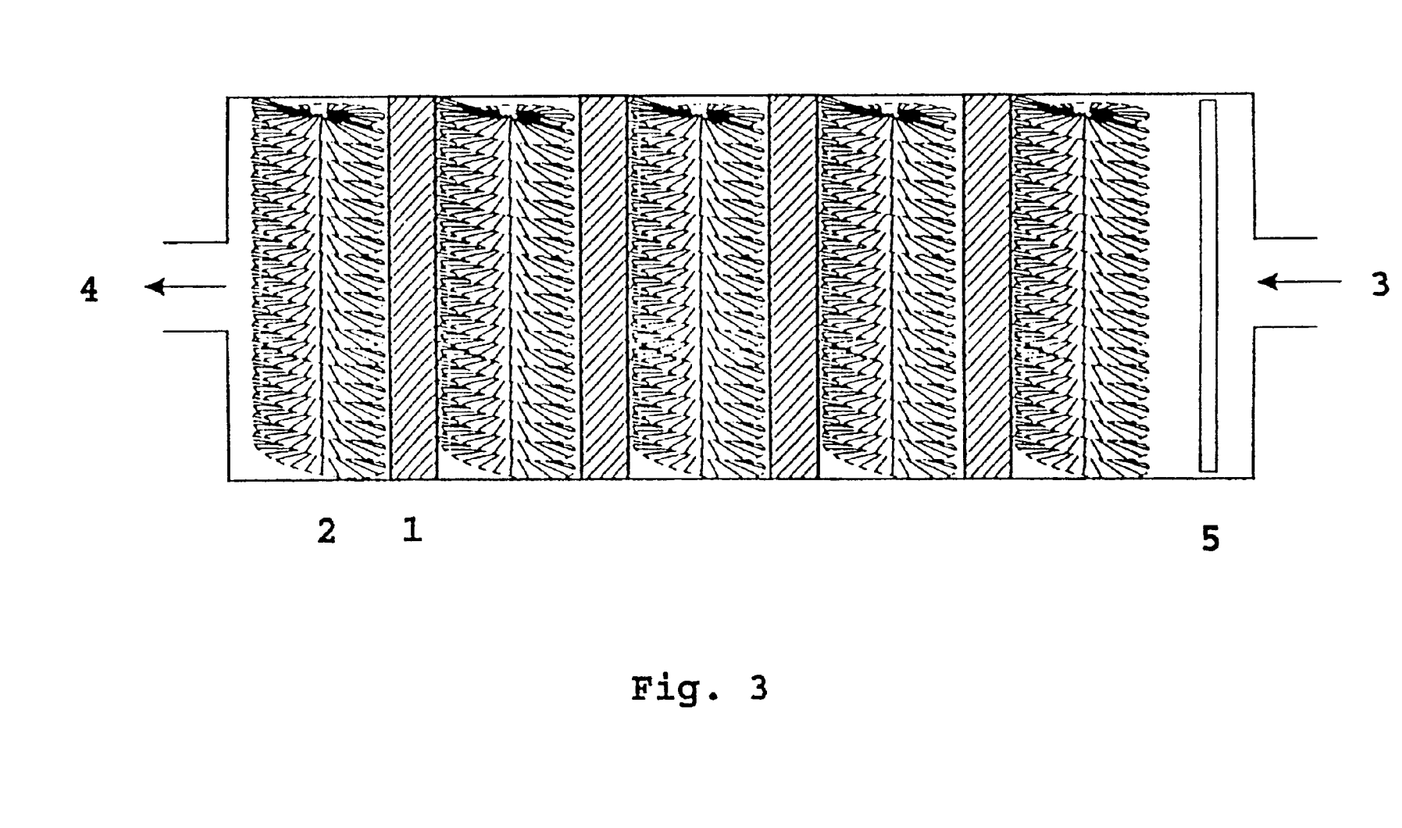
FIG. 3 represents a vertical section of the battery cell.
Figure 4:
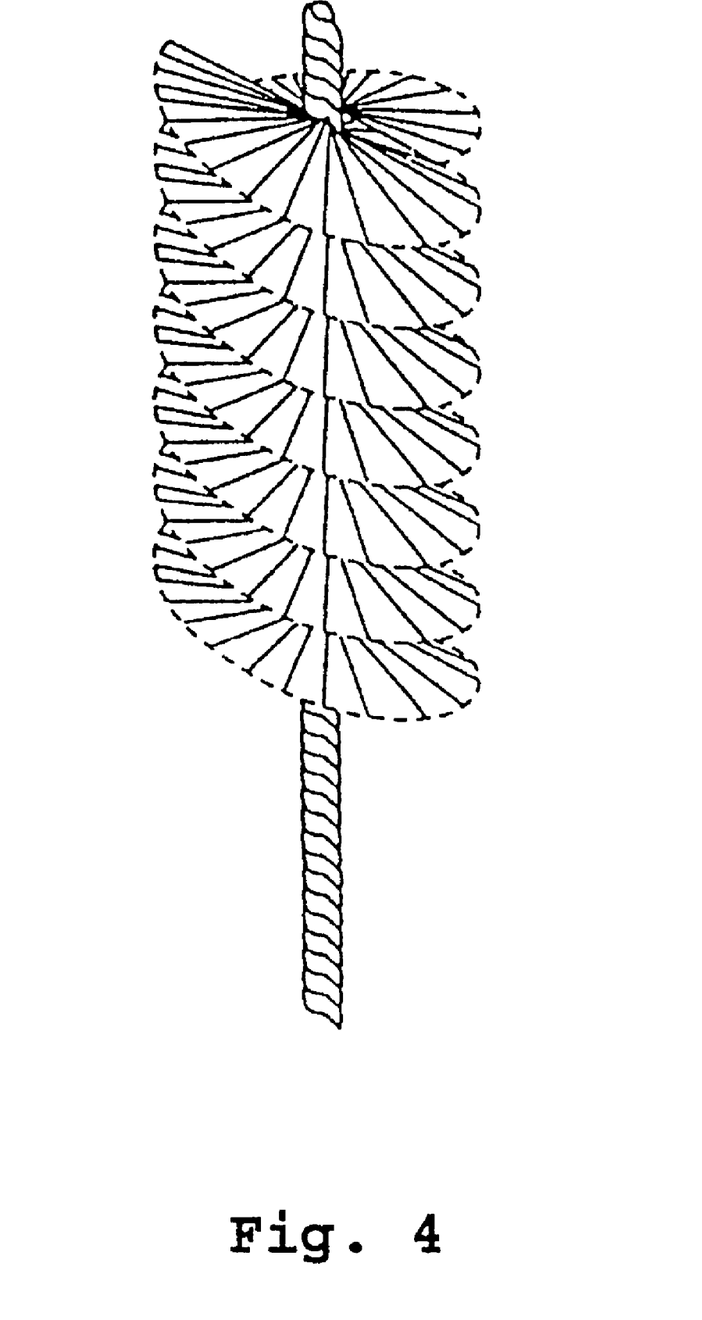
FIG. 4 shows a perspective view of a p referred version of a cathode of b rush shape.

Anodes 1 and cathodes 2 are connected in parallel rows of their own. Cathodes 2 are in a preferred embodiment in the form of bottle brushes, as described in NO 171 937. FIG. 3 shows such cathodes mounted in a cell 10, and FIG. 4 shows such a cathode separately.

On top of cell 10 there is mounted a one-way outwardly leading safety valve 24 arranged for ventilation of gas and for letting out surplus of the electrolyte 7.

The carbon fibres are catalyzed by a catalyst, which accelerates one or both reactions, e.g. silver, platinum or palladium, but also metal-organic cobalt-phtalocyanin or cobalt-tetrametoxy-phenylporphyrine.

During operation, a small surplus of HP is added to the electrolyte 7. By discharge at normal pressure, there has been used a stoichiometric factor of 1.25, i.e. 25% surplus. At constant load this will after an adjustment period lead to a HP and oxygen concentration in the electrolyte 7 which is given by the amount of HP added and the amount of HP consumed by Faraday's law and by corrosion according to the equations (2) and (3) and by HP that decomposes to oxygen that is released to the environment. Typical value of HP in the electrolyte 7 is 0.003 M–0.005 M about 0.1 to 0.2 gram HP per litre electrolyte. For comparison, the preferred concentration of HP in systems with separate catholyte and anolyte is about 0.5 M in U.S. Pat. No. 4,198,475 (Zaromb) and 5 M in U.S. Pat. No. 5,445,905 (Marsh).

An advantage with the present invention is that a battery can be produced which has a high utilization of the reactants, combined with simplicity, sturdiness and the possibility of quick mechanical charging. In this battery, losses due to reactions (2) and (3) are kept on a low level as the concentration of oxidant is kept on a low level. For the same reason, losses of oxidant because of oxygen emission to the environment are insignificant. Thus, catalysts may be used which not only catalyze reaction (5), but also those which catalyze the decomposition of $H_2O_2$ to oxygen (1) in combination with those which catalyze the reduction of oxygen to hydrogen peroxide:

$$O_2+H_2O+2e^-=HO_2^-+OH^- \quad (8)$$

Reaction (8) is catalyzed by many low cost catalysts being described in the literature on alkaline fuel cells. A catalyst of current interest for reaction (8) is activated carbon, while the decomposition of HP is catalyzed by most transition elements and mixtures thereof.

As cathodes, brush electrodes are applied as described in Norwegian Patent No. 171937. FIG. 4 shows a detail of a cathode. The cathode has the shape of a bottle brush with a core of metal and fibres of carbon fibre. The porosity is high: a cathode which is 10 cm long weighs about 5 g and has a volume of 70 cm³. The electrode was originally developed for a magnesium/oxygen sea water battery and is characterized by a high limiting current even at low concentrations of oxidant and at a moderate through-flow of electrolyte. The conductivity of 7 M KOH is approximately 30 times higher than sea water so that the current density of this battery can be approximately 30 times higher than in a sea water battery with the same physical dimensions and at the same ohmic losses in the electrolyte.

The carbon fibre surface is generally a poor catalyst, both with respect to the reduction of hydrogen peroxide and with respect to the decomposition of hydrogen peroxide to oxygen. For this reason, the carbon fibres are catalyzed with a catalyst that accelerates one or both reactions. Among the candidates of current interest which is known from the literature on alkaline fuel cells, silver, platinum and palladium are the most utilized, but also metal-organic compounds as cobalt-phtalocyanin and cobalt-tetrametoxyphenylporphyrine are applicable, especially after thermal heating of the carbon fibres to 600–800° C. in an inert atmosphere.

The addition of oxidant in the form of HP leads to the total volume of electrolyte being increased with time, the contents of aluminate in the electrolyte (according to (2)) being increased, and the concentration of free hydroxyl ions being reduced, with time.

Experience shows that as long as the concentration of aluminate is less than the concentration of free hydroxyl, the precipitation of aluminium hydroxide, $Al(OH)_3$, will not take place until after a long time. This is in spite of the electrolyte being strongly supersaturated. A precipitation of aluminium hydroxide leads to an immediate increase in the conductivity of the electrolyte because of the formation of free hydroxyl ions:

$$Al(OH)_4^-=Al(OH)_3+OH^- \quad (9)$$

For many aluminium-based battery systems, this is favourable because the electrolyte is reformed, but in this system, the settlement of aluminium hydroxide particles on the carbon fibres in the cathode leads to a reduction in the cathode performance with time.

The demand for avoiding precipitation consequently determines the capacity of the system, and will, together with the cell voltage, determine the energy density of the system.

For UUV applications, the system can be configured in two different ways. The system can have a constant mass or a constant electrolyte volume during discharge:

At a constant mass, the increase in electrolyte volume is received in an expansion container, while at a constant electrolyte volume, there is a one-way valve between the cell/battery and the environment.

As HP is added, the surplus of electrolyte is let out to the sea via a one-way valve 24. By mounting one-way valve 24 to the highest point of the battery, the handling of hydrogen can simultaneously be attended to. With both configurations, the buoyancy of the battery is changed during discharge, which demands a system for active ballasting of the UUV. This change is the least for a system of constant mass. Further, a constant mass gives somewhat larger capacity in relation to electrolyte volume. On the other hand, a constant electrolyte volume gives a considerable simpler system for gas handling (hydrogen) from the battery. Especially during the ascent phase, where the electrolyte has been saturated with hydrogen under high pressure, there are considerable amounts of gas that have to be released to the environment via a one-way or check valve 24.

So far, a considerable amount of experiments of the same cell design as shown in FIGS. 2 and 3 has been run. The anodes are 10 cm long massive cylinders of superpurity aluminium alloyed with 0.1% tin. The anode diameter is 25 mm. As cathodes we have utilized silver catalyzed carbon fibre brushes as shown in FIG. 4 with a nickel core and a diameter of 30 mm. Experiments have been run both at atmospheric pressure and at a pressure of 10 bar. Most of the experiments are made with cells which have 4 anodes and 10 cathodes, but cells in full scale for the application in ULTV's are tested.

For a preferred embodiment of a battery for UUV-application, a system is desired where the battery can quickly be recharged after one and a half day and night by changing electrolyte and filling HP up to three times, and which contains enough aluminium for operation for 100 hours at nominal load. For other applications a balanced system can be desired.

Figure 5:
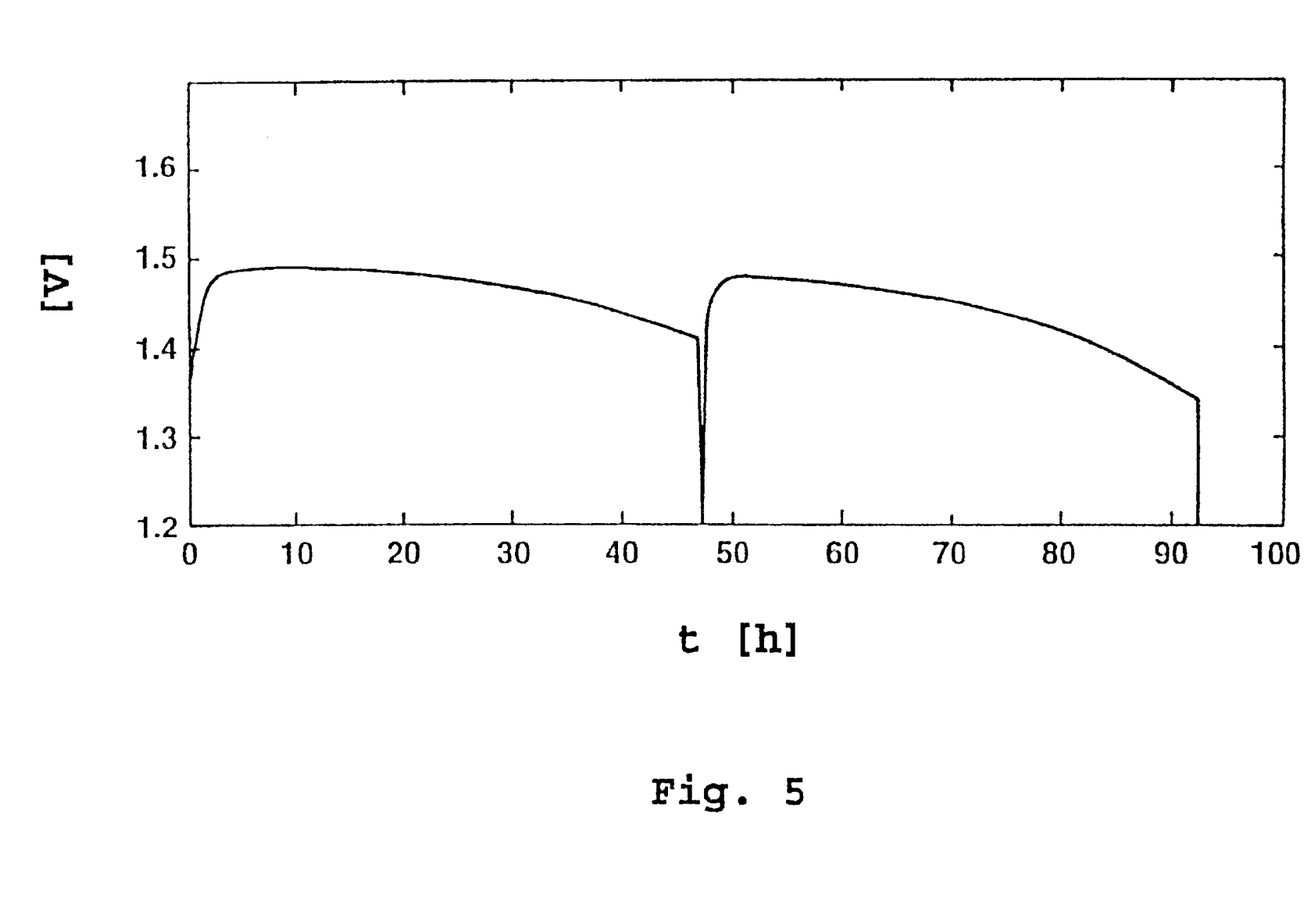
FIG. 5 shows a graphical representation of the cell voltage as a function of time during an experiment with a cell according to the invention.

FIG. 5 shows voltage versus time for a four-anode cell at a load of 9 A. 50% HP was added at 30% surplus. The start temperature was approximately 20° C., and the cell was cooled in such a way that during the experiment, the temperature was kept at 40° C. The electrolyte was circulated through the cell at a rate of 0.3 litre/sec. As electrolyte, there was used 6 M KOH with 0.01 M $Na_2SnO_3$ added. The electrolyte volume in cell and piping was about 2.1 litre. After 48 hours discharge, the electrolyte was replaced by new electrolyte. The experiment was terminated after 94 hours after a total output of 847 Ah. The consumption of aluminium was 351 g, which indicates a corrosion of 19%. Based on the start area, this gives a corrosion current of 7,7 mA/cm². Stationary concentration of hydrogen peroxide in the electrolyte (determined by permanganate titration) was 2.8 mM.

Initial voltage rise is the result of the increase in the temperature of the electrolyte from room-temperature to 40° C., and thereafter the cell voltage decreases as the conductivity of the electrolyte decreases.

By the above mentioned through-flow of 0.3 litre/sec, the pressure drop across the cell was only about 1 cm water column, so that the hydrodynamic work the circulation pump has to perform is insignificant.

On the basis of the consumption of reactants, the specific energy for the battery system is approximately 150 Wh/kg at a specific load of 3.3 W/kg. By comparison, the best NiCd-batteries have a specific energy of less than 50 Wh/kg. Taken into consideration that the weight of the Al/HP-battery submerged in sea water is less than 0.4 kg/litre, while a NiCd-battery weighs more than 1.3 kg/litre, this gives a UUV powered by a Al/HP-battery the possibility of carrying considerably larger amounts of energy than a UUV which uses NiCd-batteries in a pressure compensated embodiment.

In comparison with conventional batteries in a pressure tank, the advantage of using the Al/HP-battery is even greater. By running under increased pressure, it is found that it is possible to reduce the surplus of hydrogen peroxide from 30% down to 10% without affecting the cell voltage. This is the result of losses to the environment being reduced because of the increased solubility of oxygen with increasing pressure. An additional increase in the energy density can be achieved by increasing the alkaline electrolyte concentration. By increasing the concentration of KOH to 12 M, the energy density can be increased up to approximately 250 Wh/kg in a balanced system.

No big difference results from utilizing NaOH instead of KOH in the battery. The conductivity is somewhat lower, which gives a lower cell voltage, but this is to some extent compensated for in that a NaOH-based electrolyte has a lower density, which entails reduced weight of the battery in water.

It should also be added that a plate of aluminium can be used instead of a row of cylindrical anodes, this without giving significant alterations in the properties of the battery. The essential feature is that there is a system where material transport to the cathode is considerably easier than material transport to the anode. For the battery of the example, this was achieved both by the active surface of the cathode being considerably larger than the surface of the anode (8 m$^2$ versus approx. 0.03 m$^2$) and by the limiting current density by diffusion in a cylindrical field towards the carbon fibre surface being considerably quicker than the limiting current density by diffusion against an (in relation to the thickness of the diffusion layer) anode surface which is planar. Further, it was advantageous to have only one row of anodes arranged between two rows of cathodes as shown in FIGS. 2 and 3. In addition to increasing the difference between the anode and cathode area, this gave an even consumption of the anodes during current delivery.

What is claimed is:

1. A cell for the production of electric energy by reaction between hydrogen peroxide or oxygen, and aluminium or lithium or a mixture thereof, and hydroxyl ions in water comprising:

at least one cylindrical cathode having radially oriented carbon fibres attached to a stem of metal;

at least one anode; and electrolyte, wherein the anode and the cathode are arranged in a flowing electrolyte of KOH or NaOH dissolved in water, and with the electrolyte containing oxidant in low concentration range of 0.003 M–0.005 M.

2. A cell according to claim 1, wherein the concentration of KOH or NaOH is between 2 and 15 molar.

3. A cell according to claim 1, wherein the oxidant is oxygen or hydrogen peroxide.

4. A cell according to claim 1, wherein the concentration of the oxidant is between 0.001 molar and 0.1 molar.

5. A cell according to claim 1, further comprising a circulation pump which forces the flowing electrolyte in a circuit from an electrolyte outlet (4) on the cell to an electrolyte inlet on the cell.

6. A cell according to claim 5, further comprising an electrolyte distributor located immediately after the inlet in the cell.

7. A cell according to claim 1, wherein the electrodes and the cell are arranged for replacement of the electrodes.

8. A cell according to claim 1, wherein the cell further comprises valves arranged for replacement of the electrolyte.

9. A cell according to claim 1, further comprising a one-way outwardly leading safety valve arranged for ventilation of gas and for letting out surplus of electrolyte.

10. A cell according to claim 1, wherein the cell has anodes connected in parallel and cathodes connected in parallel.

11. A cell according to claim 5, wherein the circulation pump pumps electrolyte from one cell into another cell.

12. A cell according to claim 5, wherein the cell further comprises valves arranged for replacement of the electrolyte.

13. A cell according to claim 6, further comprising a one-way outwardly leading safety valve arranged for ventilation of gas and for letting out surplus of electrolyte.

14. A cell according to claim 5, wherein the cell has anodes connected in parallel and cathodes connected in parallel.

15. A cell according to claim 8, wherein the cell has anodes connected in parallel and cathodes connected in parallel.

* * * * *